(12) United States Patent
Nakagawa

(10) Patent No.: US 8,006,957 B2
(45) Date of Patent: Aug. 30, 2011

(54) SPOOL SHAFT SUPPORT STRUCTURE FOR DUAL-BEARING REEL

(75) Inventor: Shouji Nakagawa, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/511,067

(22) Filed: Jul. 29, 2009

(65) Prior Publication Data

US 2010/0038464 A1    Feb. 18, 2010

(30) Foreign Application Priority Data

Aug. 18, 2008    (JP) .................................. 2008-209443

(51) Int. Cl.
*A01K 89/01*    (2006.01)
(52) U.S. Cl. ........................................ 254/322; 254/321
(58) Field of Classification Search .................. 242/320, 242/321, 322; 384/490, 535, 539
See application file for complete search history.

(56) References Cited

U.S. PATENT DOCUMENTS

| 4,746,079 A * | 5/1988 | Newell .................... 242/129.7 |
| 5,402,953 A * | 4/1995 | Sato .............................. 242/321 |
| 6,851,638 B2 * | 2/2005 | Maeda et al. ................. 242/321 |
| 6,959,887 B2 * | 11/2005 | Kawasaki ..................... 242/322 |
| 7,789,336 B1 * | 9/2010 | Nakagawa et al. ........... 242/322 |
| 2002/0076126 A1 * | 6/2002 | Plesh, Sr. ..................... 384/490 |
| 2003/0111569 A1 * | 6/2003 | Hitomi ......................... 242/321 |
| 2003/0209621 A1 * | 11/2003 | Maeda et al. ................. 242/321 |
| 2004/0079822 A1 * | 4/2004 | Kawasaki ..................... 242/322 |

FOREIGN PATENT DOCUMENTS

JP    2541679 Y    4/1997

* cited by examiner

*Primary Examiner* — Emmanuel M Marcelo
(74) *Attorney, Agent, or Firm* — Shinjyu Global IP

(57) ABSTRACT

The spool shaft comprises a shaft portion, two annular first annular portions arranged on opposite ends of the shaft portion, and an annular second larger diameter portion arranged on the end of the shaft portion positioned remote from a center of the spool. Each of the first annular portions and the second larger diameter portion have an outer diameter that is larger than the outer diameter of the shaft portion. The second larger diameter portion is arranged on an outward side of the first annular portion in the axial direction so as to create a space therein between the first annular portion and second larger diameter portion.

10 Claims, 7 Drawing Sheets

SPOOL SHAFT SUPPORT STRUCTURE FOR DUAL-BEARING REEL

CROSS-REFERENCE TO RELATED APPLICATIONS

This application claims priority under 35 U.S.C. §119 to Japanese Patent Application No. 2008-209443 filed on Aug. 18, 2008. The entire disclosure of Japanese Patent Application No. 2008-209443 is hereby incorporated herein by reference.

BACKGROUND OF THE INVENTION

1. Field of the Invention

Aspects of the present invention generally relate to a spool shaft support structure, and more particularly, the present invention relates to a spool shaft support structure that rotatably supports a spool shaft for a dual bearing reel.

2. Background Information

A dual-bearing reel is a bait reel used primarily for lure fishing. It is desirable for the spool of a dual-bearing reel to rotate at a high speed in order to increase the casting distance. In order to achieve a high rotational speed of the spool in a dual-bearing reel, Japanese Utility Model Registration No. 2,541,679 presents a dual-bearing reel contrived to support both end portions of a spool shaft on bearings (e.g., ball bearings) in such a manner that a contact friction between the spool shaft and an inner race of each of the bearings is reduced. More specifically, by reducing a contact surface area between an outer circumferential surface of the spool shaft and each of the inner races, the contact friction between the spool shaft and the inner races is reduced such that the spool shaft slips and rotates relative to the inner races, thereby enabling the spool to be rotated at a high speed.

With the conventional dual-bearing reel, as described above, the spool can rotate at a high speed during casting because the contact surface area of portions where an outer circumferential surface of the spool shaft contacts an inner race has been reduced. A feasible method of enabling such a spool to rotate at even higher speeds is to reduce the contact surface area even further at the portions where an outer circumferential surface of the spool shaft contacts an inner race. However, when the contact surface areas between the inner races and the outer circumferential surface of the spool shaft are reduced further, there is the possibility that the spool shaft will shake when the spool is rotating at a high speed and the shaking will inhibit the ability of the spool to rotate smoothly.

In view of the above, it will be apparent to those skilled in the art from this disclosure that there exists a need for an improved spool shaft support structure for a dual bearing reel that rotatably supports a spool shaft with a spool fixed thereto in a reel body. This invention addresses this need in the art as well as other needs, which will become apparent to those skilled in the art from this disclosure.

SUMMARY OF THE INVENTION

Accordingly, aspects of the present invention have been created to solve the above-mentioned problems occurring in the conventional practice, and to reduce the contact area between an outer circumferential surface of a spool shaft and an inner race of a bearing in a dual-bearing reel while also preventing the spool shaft from shaking when a spool of the dual-bearing reel rotates at a high speed.

According to one aspect of the present invention, a spool shaft support structure for a dual-bearing reel that rotatably supports a spool shaft in a reel unit is disclosed. The spool shaft has a shaft portion with a spool fixed thereto for winding a fishing line onto the dual-bearing reel. The spool shaft support structure comprises a first annular portion having an outer diameter larger than the outer diameter of the shaft portion, the first annular portion being arranged on at least one outer peripheral end portion of the spool shaft remote from a center of the spool. The spool shaft support structure also comprises a second annular portion having an outer diameter larger than the outer diameter of the shaft portion, the second annular portion being arranged on one of the outer peripheral end portions of the spool shaft remote from the center of the spool and on an outward side of the first annular portion so as to create a space in the axial direction between the first annular portion and the second annular portion. The spool shaft support structure further includes a bearing having an outer peripheral portion and an inner peripheral portion, the outer peripheral portion being arranged and configured to be fixed to the reel unit, the inner peripheral portion being arranged and configured to support the first annular portion and the second annular portion.

According to another aspect of the present invention, only one of the outer peripheral end portions of the spool shaft include the first annular portion and the second annular portion.

According to still another aspect of the present invention, both outer peripheral end portions of the spool shaft include the first annular portion and the second annular portion.

According to yet another aspect of the present invention, the first annular portion and the second annular portion are each configured to protrude radially toward an inner peripheral surface of the bearing, the first annular portion and the second annular portion having a substantially semicircular shape when viewed along the axial direction of the spool shaft.

According to a further aspect of the present invention, the first annular portion and the second annular portion are each configured to protrude radially toward an inner peripheral surface of the bearing, the first annular portion and the second annular portion having a substantially rectangular shape when viewed along the axial direction of the spool shaft.

According to still a further aspect of the present invention, the spool shaft support structure is contrived such that when the first annular portion and the second annular portion are viewed along the axial direction of the spool shaft, a corner of the rectangularly shaped first and second annular portions is sustantially round.

According to yet another aspect of the present invention, the first annular portion and the second annular portion are integrally formed as a one-piece, unitary member with the shaft portion.

According to still another aspect of the present invention, the first annular portion and the second diameter portion are separately formed from the shaft portion.

According to another aspect of the present invention, the bearing further having an outer race that is fixed to the reel unit, an inner race that supports the first annular portion and the second annular portion, and a rolling body arranged between the outer race and the inner race.

These and other features, aspects and advantages of the present invention will become apparent to those skilled in the art from the following detailed description, which, taken in conjunction with the annexed drawings, discloses in the preferred and example embodiments of the present invention.

BRIEF DESCRIPTIONS OF THE DRAWINGS

Referring now to the attached drawings which form a part of this original disclosure:

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
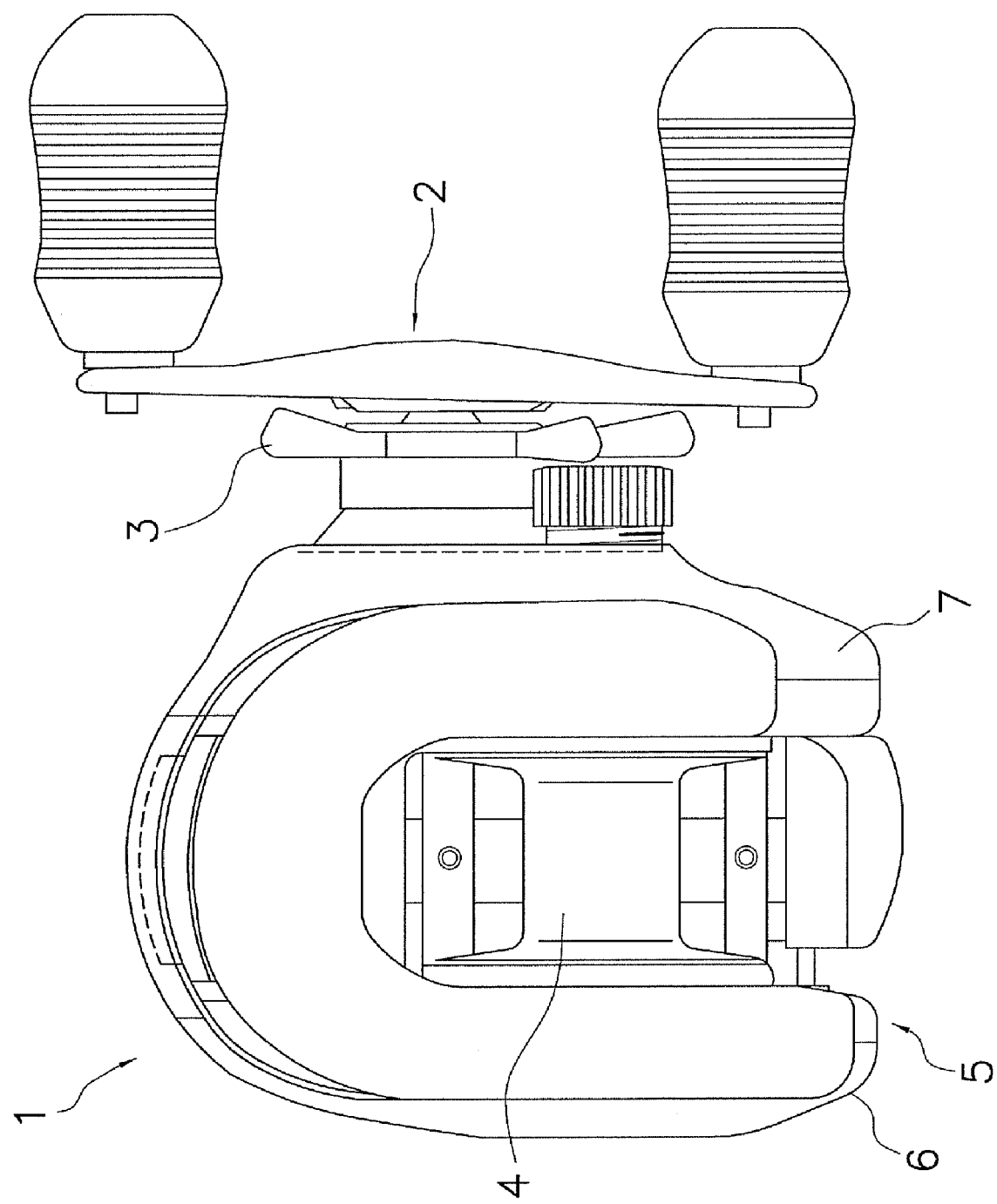
FIG. 1 is a plan view of a dual-bearing real according to an embodiment of the present invention.

Referring initially to FIG. 1, a low-profile dual-bearing reel is illustrated in accordance with one embodiment of the present invention. The dual-bearing reel includes a reel body 1, a handle 2 arranged on a side of the reel body 1 for rotating the spool, and a star drag 3 arranged on the reel body 1 side of the handle 2 for adjusting drag.

Figure 2:
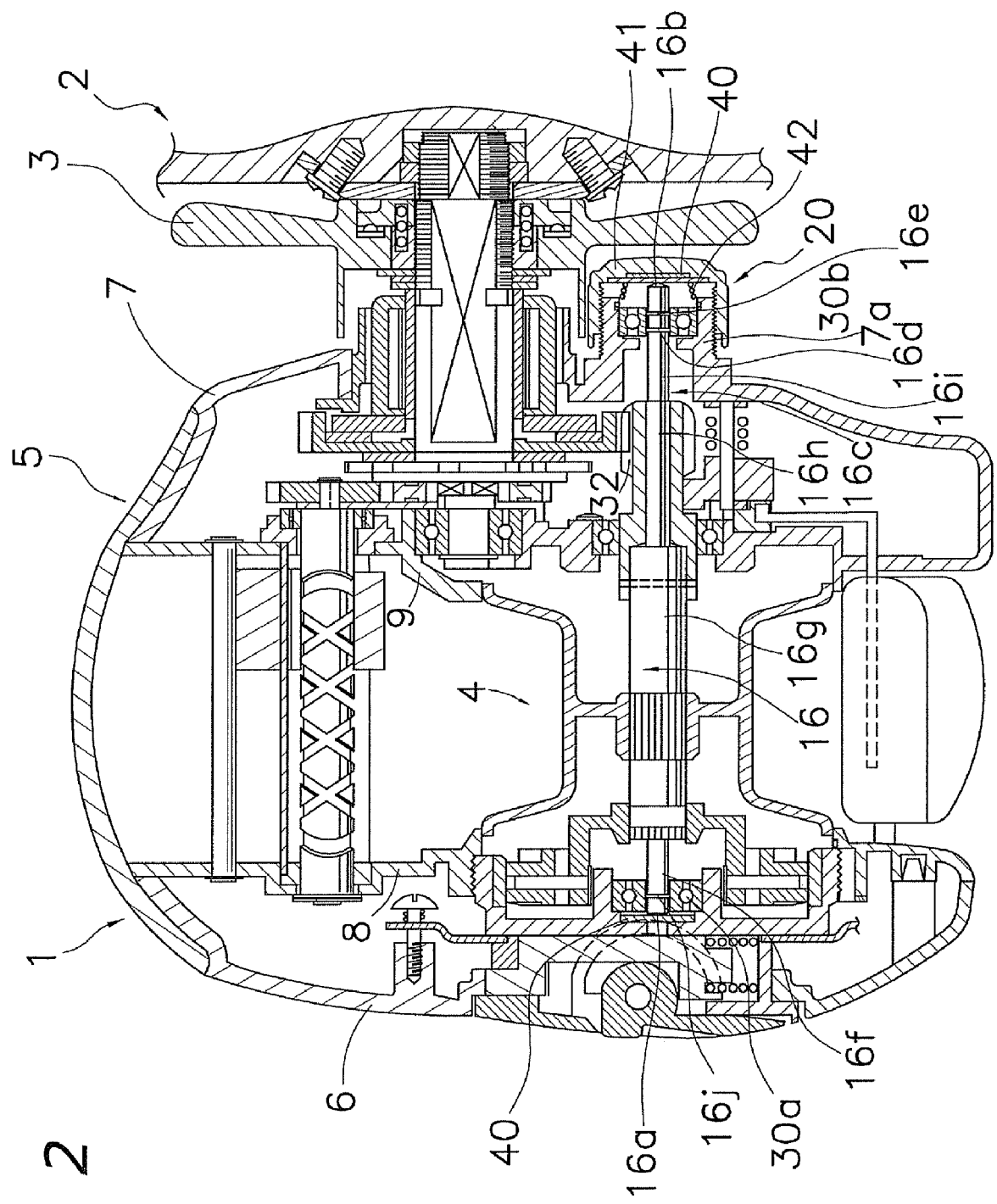
FIG. 2 is a top plan cross sectional view of the same dual-bearing reel.

As shown in FIGS. 1 and 2, the reel body 1 is provided with a frame 5 and first and second side covers 6 and 7 attached to both sides of the frame 5. The frame 5 has a first side plate 8 and a second side plate 9 arranged facing each other with a prescribed space therein between.

As shown in FIG. 2, a spool 4 configured for a fishing line to be wound onto an outer circumference thereof is arranged inside the frame 5 and a spool shaft 16 is inserted through an inside portion of the spool 4 and fixed thereto so that the spool shaft 16 and the spool 4 cannot rotate relative to each other. As shown in FIG. 2, one end (left side in FIG. 2) of the spool shaft 16 is rotatably supported on a first bearing 30a arranged in the first side plate 8 and the other end (right side in FIG. 2) passes through the second side plate 9 and is rotatably supported on a second bearing 30b arranged in the second side cover 7. A first end portion 16a on said one end (left side in FIG. 2) of the spool shaft 16 is arranged to contact a friction plate 40 arranged on the first side plate 8, and a second end portion 16b on said other end (right side in FIG. 2) is arranged to contact a friction plate 40 arranged in a cap member 41 attached to the second side cover 7. The first end portion 16a and the second end portion 16b are both configured to taper in an axially outward direction and the tip end portions thereof are configured to have a substantially rounded shape.

With reference now to FIG. 2, the spool shaft 16 also includes a cylindrical rod-like shaft portion 16c, an annular first larger diameter portions 16d (also called the first annular portion) arranged on opposite ends of the shaft portion 16c that is positioned farther from a center of the spool 4 (right-hand end in FIG. 2), an annular second larger diameter portion 16e (also called the second annular portion) arranged on the end of the shaft portion 16c that is positioned farther from a center of the spool 4 (right-hand end in FIG. 2), and an annular third larger diameter portion 16j (also called the non-first annular portion) arranged on the other end of the shaft portion 16c (left-hand end in FIG. 2). The shaft portion 16c extends from the first side plate 8 to the second side cover 7 and passes through the second side plate 9. Each of the first larger diameter portions 16d and the second larger diameter portion 16e comprises a portion of the outer circumference of the shaft portion 16c that is configured to have a larger outer diameter than the shaft portion 16c. The second larger diameter portion 16e is arranged on an outward side of the first larger diameter portion 16d that is located on the same end of the shaft portion 16c such that a space exists between the first and second larger diameter portions 16d and 16e.

The shaft portion 16c has a small-diameter first shaft portion 16f supported on the first bearing 30a, a second shaft portion 16g that has a larger diameter than the first shaft portion 16f and is fixed to an inner circumferential portion of the spool 4, a third shaft portion 16g that has a portion with the same diameter as the second shaft portion 16g and a portion with a smaller diameter and is fixed to an inner circumferential portion of a pinion gear 32 arranged and configured to receive rotation transmitted from the handle 2, and a fourth shaft portion 16i that is configured to have a smaller diameter than the smaller-diameter portion of the third shaft portion 16g and is supported on the second bearing 30b. The first shaft portion 16f and the fourth shaft portion 16i have substantially the same diameter and, thus, the internal diameters of the first bearing 30a and the second bearing 30b are substantially the same. The first shaft portion 16f, the second shaft portion 16g, the third shaft portion 16h, and the fourth shaft portion 16i are integrally formed as a one-piece, unitary member by machining, for example, a stainless steel alloy with a cutting tool.

As shown in FIG. 2, there is a first larger diameter portions 16d provided on outer circumferential portions of opposite ends of the spool shaft 16, i.e., one provided on the the fourth shaft portion 16i, which corresponds to the end of the spool shaft 16 that is separated farther from a center of the spool (on the right side in FIG. 2). Also, there is a third larger diameter portions 16j provided on outer circumferential portions of opposite ends of the spool shaft 16, i.e., one provided on the first shaft portion 16f, which corresponds to the other end of the spool shaft 16 (on the left side in FIG. 2). Moreover, a second larger diameter portion 16e is provided on an outer circumferential portion of the fourth shaft portion 16i, which corresponds to the end of the spool shaft 16 that is separated farther from a center of the spool (on the right side in FIG. 2). Thus, a first larger diameter portion 16d, a second larger diameter portion 16e, or a third larger diameter portion 16j is provided in each of three locations.

Figure 3:
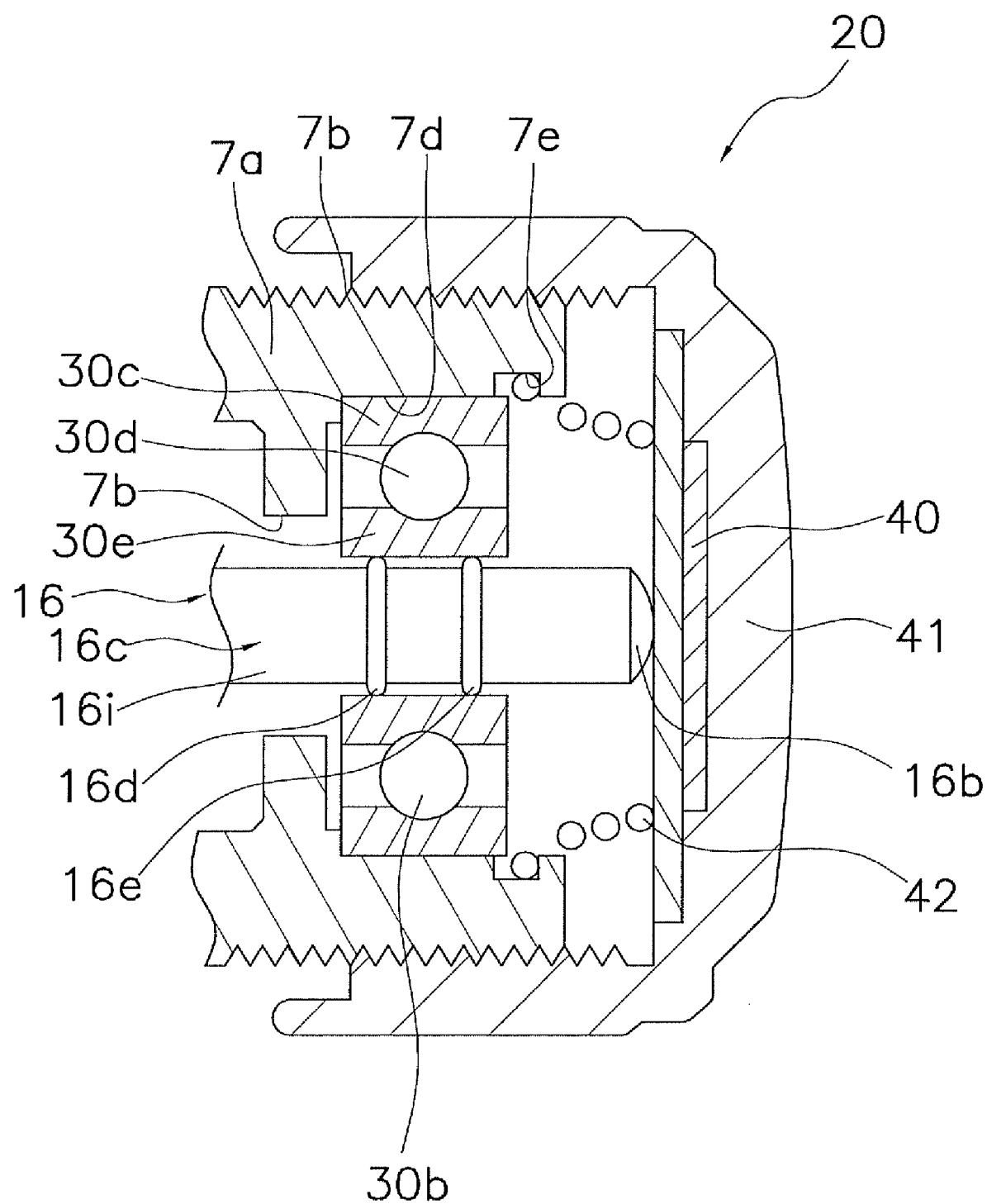
FIG. 3 is an enlarged cross sectional view showing a spool support portion of the same dual-bearing reel.
Figure 4:
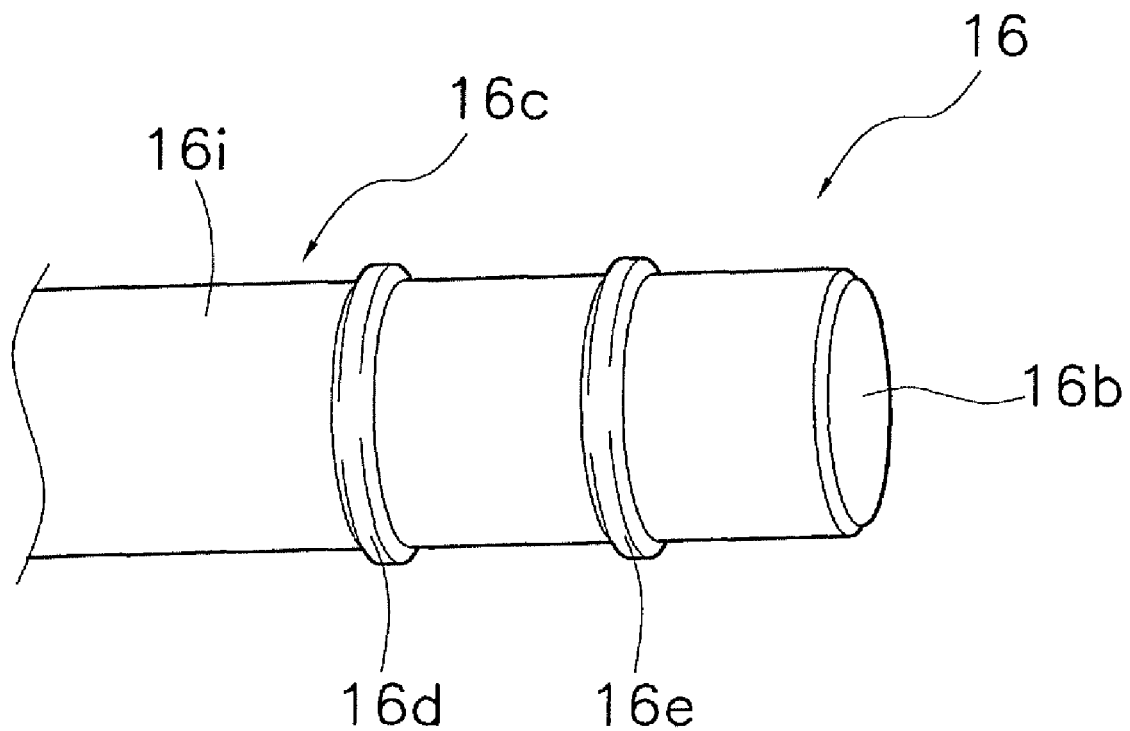
FIG. 4 is an enlarged perspective view of the same spool support portion.

As shown in FIGS. 3 and 4, each of the first larger diameter portion 16d and the second larger diameter portion 16e on the side separated farther from the center of the spool 4 is an annular portion having a larger diameter than the fourth shaft portion 16i. The first larger diameter portion 16d is arranged more inward (closer to the spool 4) and the second large diameter portion 16e is arranged on the outward side of the first larger diameter portion 16d (i.e., the side closer to the first side plate 8 or the second side cover 7) such that a space exists between the first larger diameter portion 16d and the second larger diameter portion 16e. The first larger diameter portion 16d and the second larger diameter portion 16e are formed as integral portions of the fourth shaft portion 16i (which is on the end of the spool shaft 16 separated farther from the center of the spool 4) and are formed by machining with a cutting tool at the same time as the first shaft portion 16f, the second shaft portion 16g, the third shaft portion 16h, and the fourth shaft portion 16i are formed.

As shown in FIGS. 3 and 4, the first larger diameter portion 16d and the second larger diameter portion 16e are each configured to protrude radially outward toward an inner circumferential portion of the second bearing 30b so as to have a generally rectangular shape in an axial cross sectional view of the spool shaft 16. Furthermore, the first larger diameter portion 16d and the second larger diameter portion 16e are each configured such that in an axial cross sectional view of the spool shaft 16, a corner portion of the protruding rectangular shape of the larger diameter portion is smoothly rounded. More over, all three of the larger diameter portions 16d, 16e and 16j, i.e., the first larger diameter portion 16d, the second larger diameter portion 16e, and the third larger diameter portion 16j, are formed to have the same shape.

As shown in FIGS. 2 to 4, the external diameters of the first larger diameter portions 16d and the second larger diameter portion 16e are substantially the same as an external diameter of the second shaft portion 16g or the third shaft portion 16h, or smaller than an external diameter of the second shaft portion 16g or the third shaft portion 16h. In this embodiment, the external diameters of the first larger diameter portions 16d and the second larger diameter portion 16e are substantially the same as the external diameter of the third shaft portion 16h, i.e., approximately 110% of the external diameter of the first shaft portion 16f and the fourth shaft portion 16i.

As shown in FIGS. 2 and 3, each of the first bearing 30a and the second bearing 30b is a ball bearing having an outer race 30c fixed in the first side plate 8 or the second side cover 7, an inner race 30d supported on the third larger diameter portion 16j or the first larger diameter portion 16d and the second larger diameter portion 16e, and steel balls 30e arranged between the outer race 30c and the inner race 30d. The inner race 30d is installed such that the first larger diameter portion 16d and the second larger diameter portion 16e are arranged symmetrically on the left and right sides of an axial center position of the inner race 30d. The first larger diameter portion 16d and the second larger diameter portion 16e are each configured such that an axial length thereof is not larger than 20% of an axial length of the inner race 30d. The axial space between the first larger diameter portion 16d and the second larger diameter portion 16e is set to be no larger than 50% of the axial length of the inner race 30d.

As shown in FIG. 2, a cylindrical boss 7a is formed integrally on a side portion of the second side cover 7 and configured to protrude in an outward direction. The boss 7a has an externally threaded portion 7b formed on an outer circumferential portion thereof, a through hole 7c formed through an inner circumferential portion thereof, a mounting recess 7d formed in an internal circumferential portion of the through hole 7c for mounting the second bearing 30b, and a mounting groove 7e that is formed in an inner circumferential portion of the through hole 7c in an axially outward position and configured to be deeper in a radially outward direction than the mounting recess 7d. A cap member 41 of a casting control mechanism 20 for adjusting a resistance force exerted when the spool 4 rotates is detachably mounted to the boss 7a.

The casting control mechanism 20 is a mechanism for adjusting a resistance force exerted when the spool 4 rotates and, as shown in FIG. 2, includes a plurality of friction plates 40, the cap member 41, and a spring member 42. The friction plates 40 are arranged to contact both ends of the spool shaft 16. The cap member 41 is detachably mounted to the boss 7a of the second side cover 7 and serves to adjust a friction force by pressing the friction plates 40 against both ends of the spool shaft 16. The spring member 42 is securely attached to the boss 7a such that it exerts a spring force between the cap member 41 and the second bearing 30b. The spring member 42 serves to prevent the second bearing 30b from becoming dislodged from the boss 7a and to restrict rotation of the cap member 41.

In this dual-bearing reel, outer circumferential portions of the first larger diameter portion 16d and the second larger diameter portion 16e of the spool shaft 16 are supported on an inner circumferential portion of the second bearing 30b. The first larger diameter portion 16d and the second larger diameter portion 16e are arranged with a space in-between and each comprises a portion of the fourth shaft portion 16i (which is on the end separated farther from the center of the spool 4) that is configured to have a larger diameter than the shaft portion 16c. In this embodiment, since the first larger diameter portion 16d and the second larger diameter portion 16e are arranged with a space there-between, a contact surface between an outer circumferential surface of the spool shaft 16 and an inner circumferential surface of the second bearing 30b can be reduced. Also, in this embodiment, since two larger diameter portions, i.e., a first larger diameter portion 16d and a second larger diameter portion 16e, are provided, the spool shaft 16 can be supported across a wider span in an axial direction than when only one larger diameter portion is provided (i.e., the spool shaft 16 is supported across an axial span equal to the distance from an inside edge (left side in FIG. 3) of the first larger diameter portion 16d to an outside edge (right side in FIG. 3) of the second larger diameter portion 16e). As a result, even if a drag force or other large load acts on the spool shaft 16, the spool shaft 16 can be prevented from flexing.

Additionally, since the two larger diameter portions, i.e., the first larger diameter portion 16d and the second larger diameter portion 16e, can support the spool shaft in a reliable fashion, the spool shaft 16 can be reliably prevented from shaking when the spool 4 rotates at a high speed. Also, by providing only a first larger diameter portion 16d on the first shaft portion 16f (i.e., on the end of the spool shaft 16 that is closer to the center of the spool 4) and providing both a first larger diameter portion 16d and a second larger diameter portion 16e only on the fourth shaft portion 16i (i.e., on the end of the spool shaft 16 that is farther from the center of the spool 4 and more likely to shake when the spool 4 rotates at a high speed), shaking of the spool shaft 16 can be prevented reliably without the working steps required to manufacture the spool shaft 16 and the spool shaft 16 can be prevented from shaking and contacting an inner circumferential portion of the pinion gear 32, which is arranged on the end of the spool shaft 16 that is separated farther from the center of the spool 4. As a result, the rotation performance of the spool 4 is less likely to be degraded.

EFFECTS OF THE INVENTION

In the present invention, a first larger diameter portion and a second larger diameter portion are provided on a spool shaft of a spool of a dual-bearing reel and supported on an inner circumferential portion of a bearing. The first larger diameter portion and the second larger diameter portion each comprise a portion of the spool shaft that is larger than a shaft portion and are arranged to be spaced apart from each other. As a result, a contact area between an outer circumferential surface of the spool shaft and an inner circumferential surface of the bearing can be reduced while also preventing the spool shaft from shaking when the spool tates at a high speed.

OTHER EXAMPLE EMBODIMENTS (a) Although in the previously described embodiment the dual-bearing reel is a low-profile type dual-bearing reel, the present invention is not limited to such a reel and can also be applied to a spool of a round dual-bearing reel.

Figure 5:
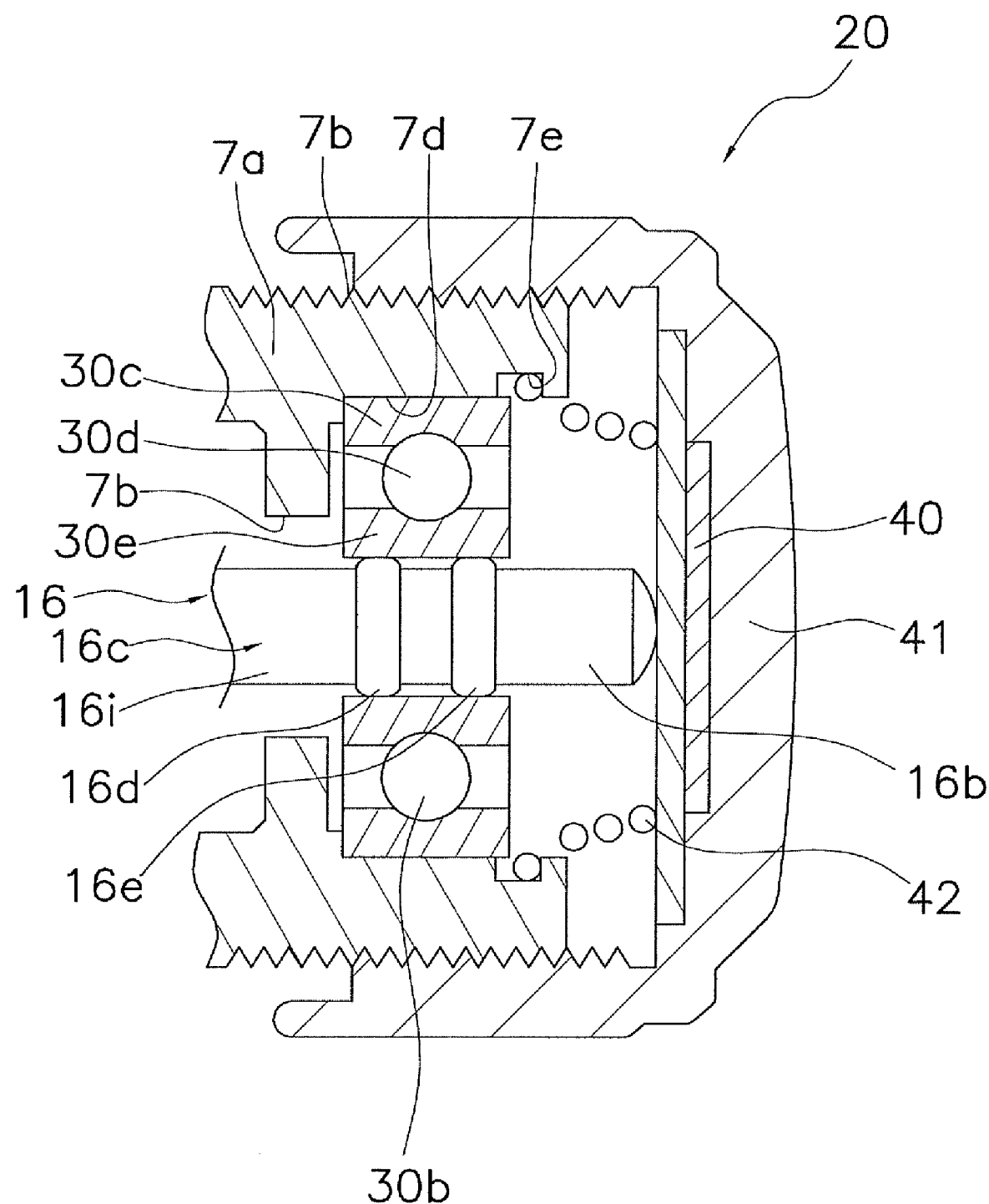
FIG. 5 is an enlarged cross sectional view of another embodiment and is equivalent to FIG. 3.
Figure 6:
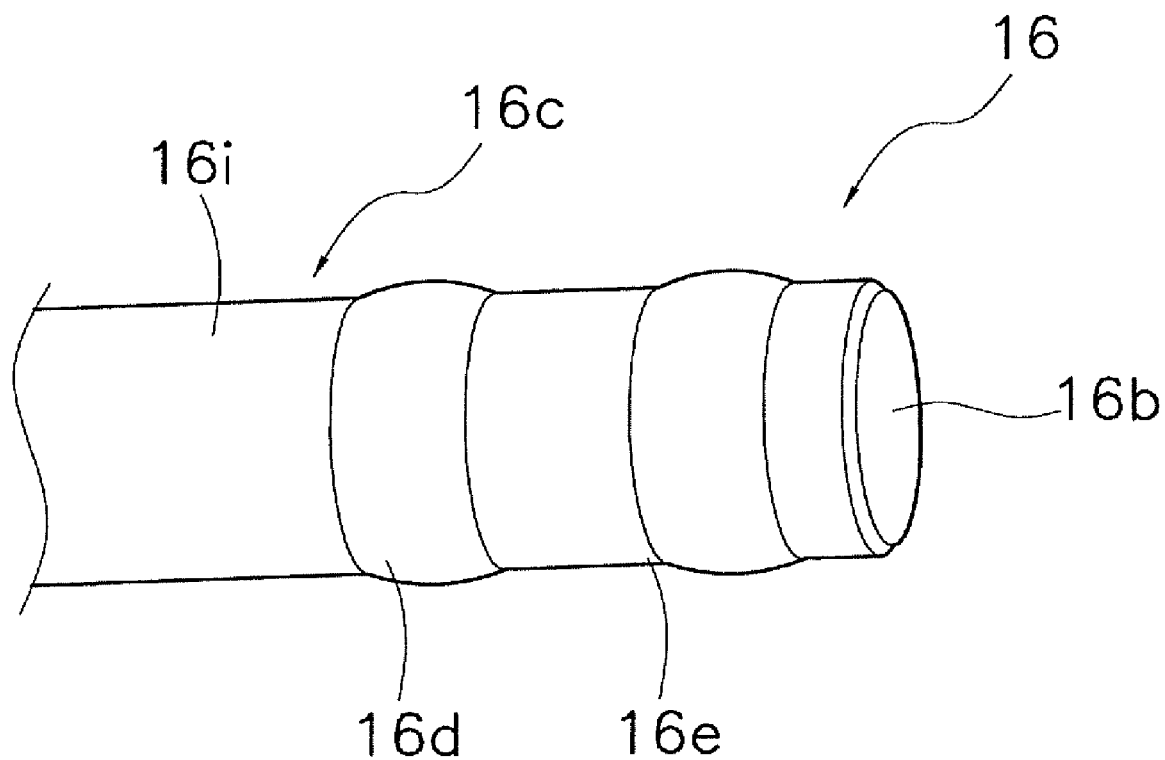
FIG. 6 is an enlarged perspective view of another embodiment and is equivalent to FIG. 4.
Figure 7:
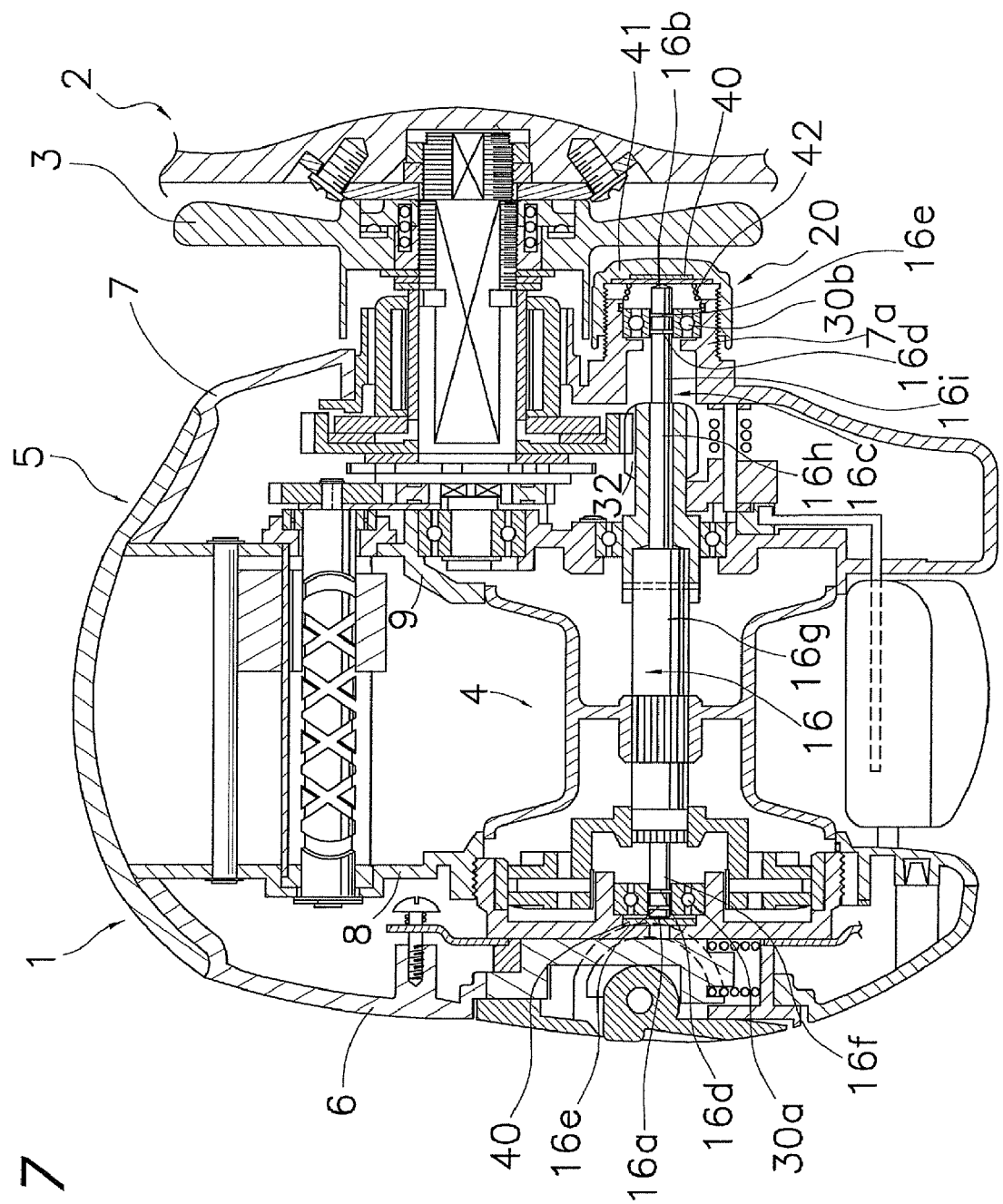
FIG. 7 is an cross sectional view of another embodiment and is equivalent to FIG. 2.

(b) Although in the previously described embodiment the first larger diameter portion 16d and the second larger diameter portion 16e are each configured to protrude radially outward toward an inner circumferential portion of the second bearing 30b so as to have a generally rectangular shape in an axial cross sectional view of the spool shaft 16, it is also acceptable for the first larger diameter portion 16d and the second larger diameter portion 16e to be configured to protrude toward an inner circumferential portion of the second bearing 30b so as to have a generally semicircular shape in an axial cross sectional view of the spool shaft 16 as shown in FIGS. 5 and 6.

(c) Although in the previously described embodiment the first larger diameter portion 16d and the second large diameter portion 16e are formed as integral portions of the fourth shaft portion 16i, it is also acceptable for the first larger diameter portion 16d and the second larger diameter portion 16e to be formed as separate entities from the fourth shaft portion 16i.

(d) The dimensions of the first larger diameter portions 16d, the second larger diameter portion 16e, the first bearing 30a, and the second bearing 30b are not limited in any way by the previously explained embodiment.

(e) Although in the previously described embodiment two larger diameter portions (i.e., a first larger diameter portion) 6d and a second larger diameter portion 16e) are only provided on an outer circumference of the end of the spool shaft 16 that is farther from the center of the spool 4 (i.e., on the fourth shaft portion 16i and not on the first shaft portion 16f), it is also acceptable to provide two larger diameter portions (i.e., a first larger diameter portion 16d and a second larger diameter portion 16e) on each of both ends of the spool shaft 16 (i.e., on outer circumferential portions of both the fourth shaft portion 16i and the first shaft portion 16f). In such a case, there would be a first larger diameter portion 16d or a second larger diameter portion 16e provided in each of four locations and the spool shaft 16 could be rotatably supported in a more reliable fashion.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," "with" and their derivatives. Also, the term "part," "section," "portion," "member," or "element" when used in the singular can have the dual meaning of a single part or a plurality of parts.

In addition, the following directional terms "forward", "rearward", "above", "below", "downward", "upward", "vertical", "horizontal", "inner", "outer", "longitudinal" and "Tansverse" as well as any other similar directional terms refer to those directions of a device equipped with the present invention. Accordingly, these terms, as utilized to describe aspects of the present invention, should be interpreted relative to a device equipped with the present invention.

Moreover, the term "configured" as used herein to describe a component, section or part of a device implies the exist of other unclaimed or unmentioned component(s), section(s), or part(s) of that device necessary or required to carry out a desired function. The terms of degree such as "substantially", "about" and "approximately" as well as any other similar terms used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool shaft support structure for a dual-bearing reel that rotatably supports a spool shaft in a reel unit, the spool shaft having a shaft portion with a spool fixed the shaft portion for winding a fishing line onto the dual-bearing reel, the spool shaft support structure comprising:

a first annular portion having an outer diameter larger than the outer diameter of the shaft portion, the first annular portion being formed on the outer peripheral surface of at least one end portion of the spool shaft;

a second annular portion having an outer diameter similar to the outer diameter of the first annular portion, the second annular portion being formed on the outer peripheral surface of the spool shaft and adjacent to the first annular portion so as to define a vacant space on the surface of the spool shaft between the first annular portion and the second annular portion; and a bearing having inner and outer surface portions extending along the axial direction of the spool shaft, the outer surface portion being fixed to the reel unit, and the inner surface portion extending axially across the vacant space to simultaneously support the first annular portion and the second annular portion.

2. The spool shaft support structure according to claim 1, wherein only one of the outer peripheral end portions of the spool shaft includes the first annular portion and the second annular portion.

3. The spool shaft support structure according to claim 1, wherein both outer peripheral end portions of the spool shaft includes the first annular portion and the second annular portion.

4. The spool shaft support structure according to claim 1, wherein the first annular portion and the second annular portion are each configured to protrude radially toward an inner peripheral surface of the bearing, the first annular portion and the second annular portion having a substantially semicircular shape when viewed along the axial direction of the spool shaft.

5. The spool shaft support structure according to claim 1, wherein the first annular portion and the second annular portion are each configured to protrude radially toward an inner peripheral surface of the bearing, the first annular portion and the second annular portion having a substantially rectangular shape when viewed along the axial direction of the spool shaft.

6. The spool shaft support structure according to claim 5, wherein when the first annular portion and the second annular portion are viewed along the axial direction of the spool shaft, a corner of the rectangularly shaped first and second annular portions is sustantially round.

7. The spool shaft support structure according to claim 1, wherein the first annular portion and the second annular portion are integrally formed as a one-piece, unitary member with the shaft portion.

8. The spool shaft support structure according to claim 1, wherein the first annular portion and the second diameter portion are separately formed from the shaft portion.

9. The spool shaft support structure according to claim 1, wherein the bearing further having an outer race that is fixed to the reel unit, an inner race that supports the first annular portion and the second annular portion, and a rolling body arranged between the outer race and the inner race.

10. A spool shaft support structure for a dual-bearing reel that rotatably supports a spool shaft in a reel unit, the spool shaft having a first end portion, a second end portion and a shaft portion disposed between the first and second end portions, the shaft portion fixedly supporting a spool for winding a fishing line onto the dual-bearing reel, the spool shaft support structure comprising:

a first annular portion having an outer diameter larger than the outer diameter of the shaft portion, the first annular portion being formed on an outer surface of the first end portion of the spool shaft;

a second annular portion having an outer diameter similar to the outer diameter of the first annular portion, the second annular portion being formed on the outer surface of the first end portion of the spool shaft and adjacent to the first annular portion so as to define a vacant space on the surface of the spool shaft between the first annular portion and the second annular portion;

a first bearing member having inner and outer surface portions extending along the axial direction of the spool shaft, the outer surface portion being fixed to the reel unit, and the inner surface portion supporting the second end portion; and a second bearing member having inner and outer surface portions extending along the axial direction of the spool shaft, the outer surface portion being fixed to the reel unit, and the inner surface portion extending axially across the vacant space to simultaneously support the first end portion via the first annular portion and the second annular portion.

* * * * *